July 30, 1968 W. H. COTTRELL, JR 3,395,394

PRIORITY SELECTOR

Filed Oct. 20, 1965 3 Sheets-Sheet 1

DATA TRANSFER SYSTEM

INVENTOR.
WILLIAM H. COTTRELL JR.

BY Ronald M. O'Keefe

ATTORNEY

United States Patent Office 3,395,394
Patented July 30, 1968

3,395,394
PRIORITY SELECTOR

William H. Cottrell, Jr., Phoenix, Ariz., assignor to General Electric Company, a corporation of New York Filed Oct. 20, 1965, Ser. No. 498,762
12 Claims. (Cl. 340—172.5)

ABSTRACT OF THE DISCLOSURE

An apparatus utilizing a plurality of bistable elements facilitates the selection of a signal representing the one of a plurality of priority related input signals having the highest priority by generating an output signal from each element receiving an input signal which sequentially propagates through the elements adapted to receive lower priority input signals.

This invention relates to a device for selecting which one of a plurality of equipment units may obtain access to a common apparatus and more particularly to a device which gives precedence to the equipment unit with the highest priority when several equipment units request access to the common apparatus at the same time.

In a data processing system, various arithmetic and input-output data operations are performed by a plurality of equipment units which are required to communicate with a common apparatus or central data storage. Inasmuch as the equipment units operate at different speeds or may be required to communicate with the common apparatus within a predetermined time period, some cannot wait as long as others before being granted access to the common apparatus. Since more than one equipment unit may request communication at any given instant, it is necessary to select the one which is to first receive access to the common apparatus. Therefore, each equipment unit must be given a priority relative to the other equipment units to permit a priority selector to select the equipment unit allocated the highest priority, when more than one equipment unit requires access to the common apparatus.

Priority selectors normally establish the priority of one request over another request by providing an arrangement of control element and storage cells. In one previously known priority selection device, only the highest priority request present at a given instant is allowed to be entered into its respective storage cell. The highest priority request signal inhibits the entry of each lower priority request. However, a complex arrangement of input control elements and additional timing considerations are required to prevent multiple request entries into the storage cells.

Another prior art priority selection device employs two storage cells per equipment unit and an output control element arrangement. The output signal of the pair of storage cells corresponding to the highest priority request is applied to the output control elements of the pair of priority storage cells of the next lowest priority to inhibit the output signal of these cells. This inhibiting effect is propagated from one output control element to the next. This arrangement effectively provides inhibiting of the output from each pair of lower priority storage cells; however, it also requires the additional expense of a larger number of storage cells.

Still another previously known priority selection device samples are requests from a plurality of equipment units for parallel entry into corresponding storage cells. The output signal of each storage cell is applied in parallel to the output control elements of all lower priority storage cells to inhibit the selection capability of the lower priority storage cells. Each storage cell must be capable of providing sufficient output signal power to furnish an inhibiting signal to the output control elements of each lower priority storage cell. Since each output control element must receive a signal from all higher priority storage cells, the output control elements corresponding to the lower priority storage cells become progressively larger multiple input elements. Prior art priority selection devices require external control elements to indicate the presence of a request signal. In one prior art arrangement, for example, the output of each storage cell is applied to an external control element to permit indication of the presence of a request signal. This arrangement requires an additional control element to provide a request present indication. Accordingly, it is desirable to provide an improved access request signal indicating arrangement.

Priority selection devices for selecting the highest priority access request from a plurality of access requests thus become increasingly complex and expensive as the number of equipment units sharing one common apparatus and as the operating speeds of the equipment units increase, making it desirable to provide an improved priority selection device.

It is therefore an object of the present invention to provide an improved priority selector.

It is another object of this invention to provide a simplified priority selector having a minimum of elements.

It is still another object of this invention to provide a more reliable priority selector.

It is a further object of this invention to provide a priority selector having greater flexibility.

It is still a further object of this invention to provide an improved apparatus for indicating the presence of an access request.

Briefly stated, in accordance with one illustrated embodiment of the invention, a priority selector is provided employing simple control elements and bistable storage cells to select the highest priority request from the plurality of access requests received from associated equipment units. All requests from the equipment units are examined at the same time and entered into storage cells, one storage cell being provided for each equipment unit. After all requests are entered, the bistable storage cells are either in one state, if requests have been received from the corresponding equipment units, or otherwise in the other state. An output control element is connected to the output of each storage cell. The output signal from each storage cell in the one state inhibits the output control element of the next lower priority request storage cell and also places the next lower priority request storage cell in its one state. This process continues from the highest priority storage cell receiving a request until all lower priority storage cells are set to the one state and have their output control elements inhibited. Thus, in the arrangement according to the present invention, the entry of a request signal into any storage cell placing it in the one state initiates a selection sequence, the output signal of the storage cell placing all lower priority storage cells in the one state and inhibiting all lower priority cell outputs. Since there may be several request signals entered into storage cells simultaneously, each request signal initiates a separate selection sequence. This leaves only the output control element of the highest priority storage cell in the one state uninhibited for controlling access by its respective equipment unit to the central data storage. Each storage cell thus provides output signals only to its own output control element and to the input and output control elements of the next lower priority storage element, keeping output loading of the storage cells to a minimum.

According to another embodiment of the invention, the entry of a request signal into a storage cell, placing it in the one state, initiates a plurality of selection sequences to reduce the time interval required for inhibiting the outputs of lower priority storage cells. Each storage cell is connected so that when it is in the one state, its output will place the next and at least one other lower priority storage cell in the one state as well as inhibit the output control element of the next lower priority storage cell. Therefore the entry of a request signal into a storage cell placing it in the one state also initiates parallel selection sequences to inhibit the outputs of all lower priority storage cells. The time required for inhibiting is reduced to the time required to serially inhibit the outputs of lower priority storage cells in the gap between each point where selection sequences are initiated. Only the output of the highest priority storage cell in the one state remains uninhibited to control access of its respective equipment unit to the central data storage.

Since the lowest priority storage cell is always in the one state following a selection sequence, its output is available to the central data storage as an indication that a request is present. The central data storage then provides a control signal to the priority selector which responds by preventing further entry of request signals into the storage cells and by producing an output signal from the highest priority storage cell receiving a request signal. This output signal then controls access by its corresponding equipment unit to the central data storage.

The subject matter of the invention is particularly pointed out and distinctly claimed in the concluding portion of the specification. The invention, however, both as to organization and operation may best be understood by reference to the following description in connection with the accompanying drawings, in which:

Figure 1:
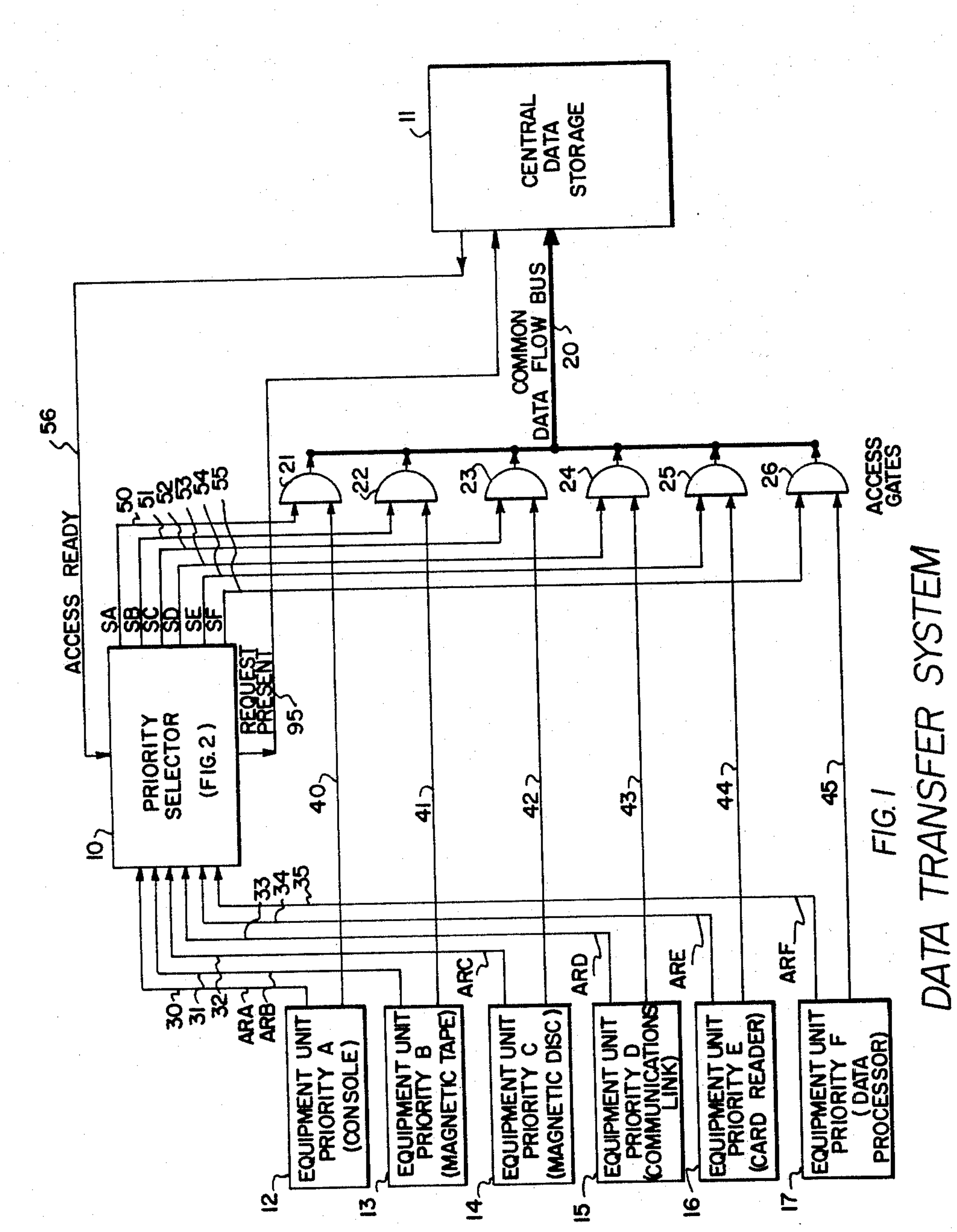
FIG. 1 illustrates in block diagram form an exemplary arrangement of a priority selector according to this invention.

With reference to FIG. 1, priority selector 10 is disposed between a plurality of equipment units 12–17 and access gates 21–26. Common data flow bus 20 connects access gates 21–26 to central data storage 11. In the illustrated data transfer system, equipment units 12–17 are arranged to communicate with central data storage 11 through gates 21–26 respectively. Since more than one equipment unit may desire to communicate with central data storage 11 at a given instant, it is necessary to select the equipment unit which will be permitted to communicate with central data storage 11. Priority selector 10 receives access request signals from equipment units 12–17 and selects the request from the highest priority equipment requesting access at a given instant. Priority selector 10 then provides an output signal, corresponding to the selected request signal for application to the appropriate access gate to provide a communication path between the selected equipment unit and the central data storage 11. Central data storage 11 may be any type of memory, such as a magnetic core memory, with associated control for storage and retrieval of information.

Equipment unit 12, which is identified in FIG. 1 as equipment unit priority A, provides an access request signal ARA to priority selector 10 on line 30. Similarly equipment units 13–17 which are identified as equipment unit priority B—equipment unit priority F respectively, provide access request signals ARB–ARF at appropriate times to priority selector 10 on lines 31–35 respectively. In the embodiment of FIG. 1, the equipment units are allocated priority in the order of successive letters of the alphabet. Thus, equipment unit priority A is allocated highest priority, equipment unit priority B is allocated next highest priority and equipment unit priority F is allocated lowest priority.

Equipment units 12–17 provide data outputs on lines 40–45 to access gates 21–26 respectively, as shown in FIG. 1. Each of the equipment units 12–17 may be one of a plurality of known data processing peripheral subsystems which are capable of providing access request signals to establish data transfer operations with central data storage 11. For instance, data input to the central data storage may originate from equipment unit priority A—equipment unit priority F which are an operator console, magnetic tape unit, magnetic disc storage unit, communications link, card reader, and a data processor respectively, as indicated in FIG. 1. For clarity, only data flow from the equipment units to the central data storage is described. However, by suitable modification of the arrangement, data flow from central data storage 11 to the equipment units may also be provided.

Priority selector 10 responds to the presence of a plurality of access request signals on lines 30—35 from equipment units 12–17 respectively to select the highest priority request present at a given instant. Priority selector 10 then produces an output signal, corresponding to the highest priority request signal present, for application to the appropriate one of access gates 21–26 over the corresponding one of output lines 50–55. The notation SA identifies the signal which is generated by priority selector 10 in response to access request signal ARA from equipment unit 12. Signal SA is applied to access gate 21 on line 50. Similarly, priority selector output signals SB–SF are applied over lines 51–55 to access gates 22–26 respectively, as shown in FIG. 1.

Priority selector 10 also provides an indication of the presence of an access request to central data storage 11 by means of the request present signal on line 95. Central data storage 11 acknowledges the request present signal by providing an access ready signal on line 56 interconnecting priority selector 10 and central data storage 11. Priority selector 10 responds to the access ready signal by preventing the entry of further access requests until the presently selected request has been serviced by central data storage 11. No other equipment unit access requests will therefore be entered while the equipment corresponding to the highest priority access request signal present upon issuance of the access ready signal is receiving access to central data storage 11.

The servicing of a plurality of different equipment units by the system of FIG. 1, each equipment unit being allocated a different priority for receiving access to central data storage 11, is accomplished by means of access gates 21–26 and common data flow bus 20. Access gates 21–26 perform as a switching center which is controlled by priority selector 10 through the priority selector output signals on lines 50–55. Data flow lines 40–45 from equipment units 12–17 are connected to access gate 21–26 respectively. Access gates 21–26 are selectively enabled, one at a time, by the priority selector output signals from priority selector 10 to provide a data transfer path for the corresponding equipment unit to central data storage 11. For example, if request signals are present from equipment unit priority B and equipment unit priority E, priority selector 10 produces priority selector output signal SB on line 51 to enable access gate 22, permitting data flow on line 41 from equipment unit priority B to common data flow bus 20. A data transfer path is thus provided between equipment unit priority B and central data storage 11. Similarly priority selector 10 generates priority selector output signals SA, SC, SD, SE and SF at appropriate times on output lines 50 and 52–55 to enable access gates 21 and 23–26 respectively, thus providing a data transfer path from the selected equipment unit to common data flow bus 20 and central data storage 11. In FIG. 1, lines 20 and 40–45 are illustrated as one line, however, each line may consist of a plurality of signal paths.

Following establishment of a data flow path, the selected equipment unit proceeds to transfer data to central data storage 11. At the completion of the data transfer by the selected equipment unit, central data storage 11 initiates the next selection sequence by removal from line 56 of the access ready signal to priority selector 10.

Priority selector 10 responds to removal of the access ready signal by sampling access requests from equipment units 12–17 at regular intervals to produce the next priority selector output signal, establishing the next equipment unit access to central data storage 11. If no access requests are present, priority selector 10 continues to sample the inputs on lines 30–35 at regular time intervals. When a request input is present and entered, priority selector 10 provides a request present signal on line 95 to central data storage 11 which produces an access ready signal on line 56 to priority selector 10. The access ready signal causes discontinuation of sampling of access request signals present on input lines 30–35. Priority selector 10 then selects the highest priority access request and produces a corresponding priority selector output signal. The priority selector output signal corresponding to the highest priority request present at a given instant is provided on one of lines 50–55 to enable the corresponding one of access gates 21–26, connecting the selected equipment unit to common data flow bus 20 for access to central data storage 11. All successive access requests are similarly processed.

Figure 2:
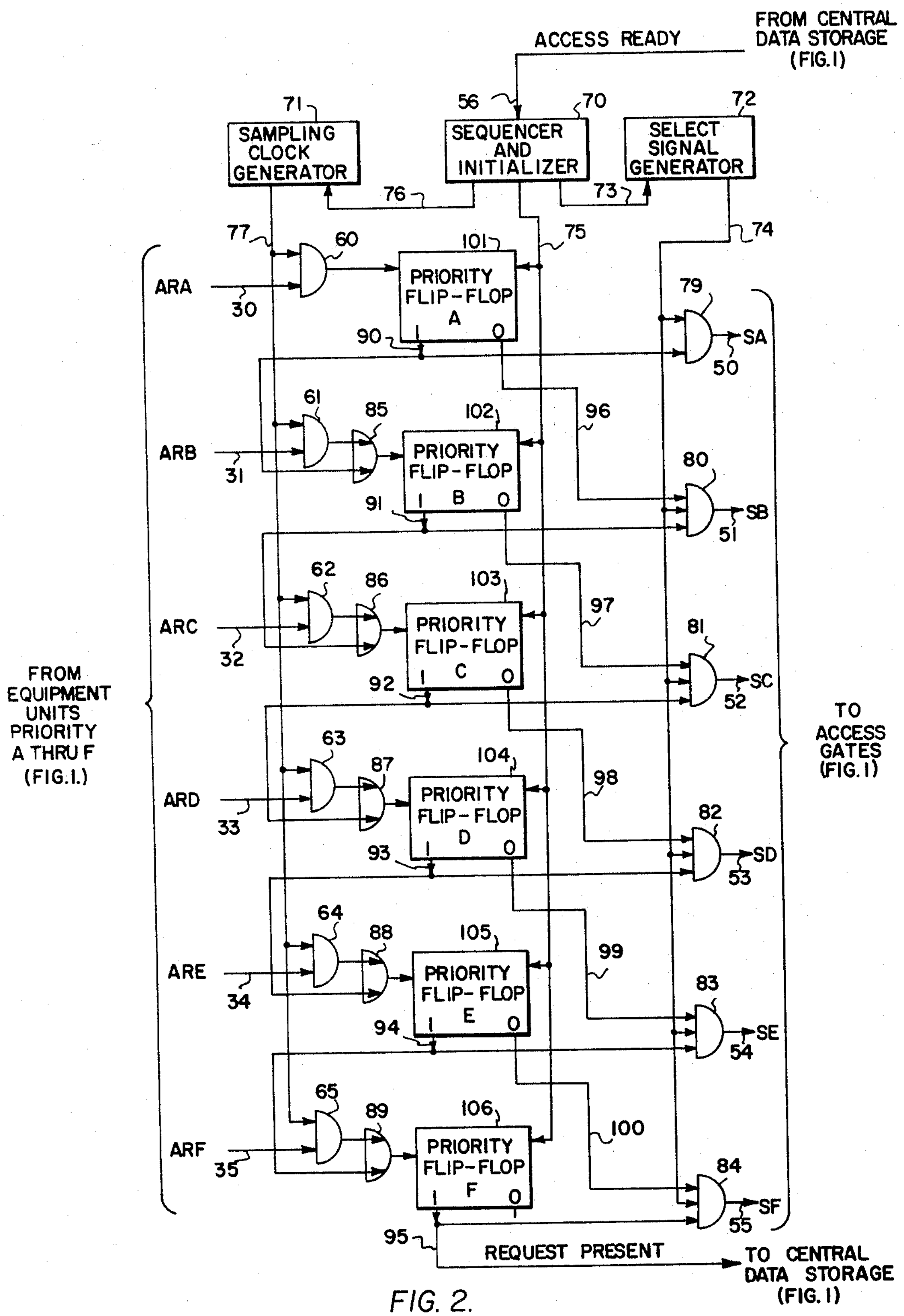
FIG. 2 is a logical schematic diagram of one embodiment of the priority selector shown in FIG. 1.
Figure 3:
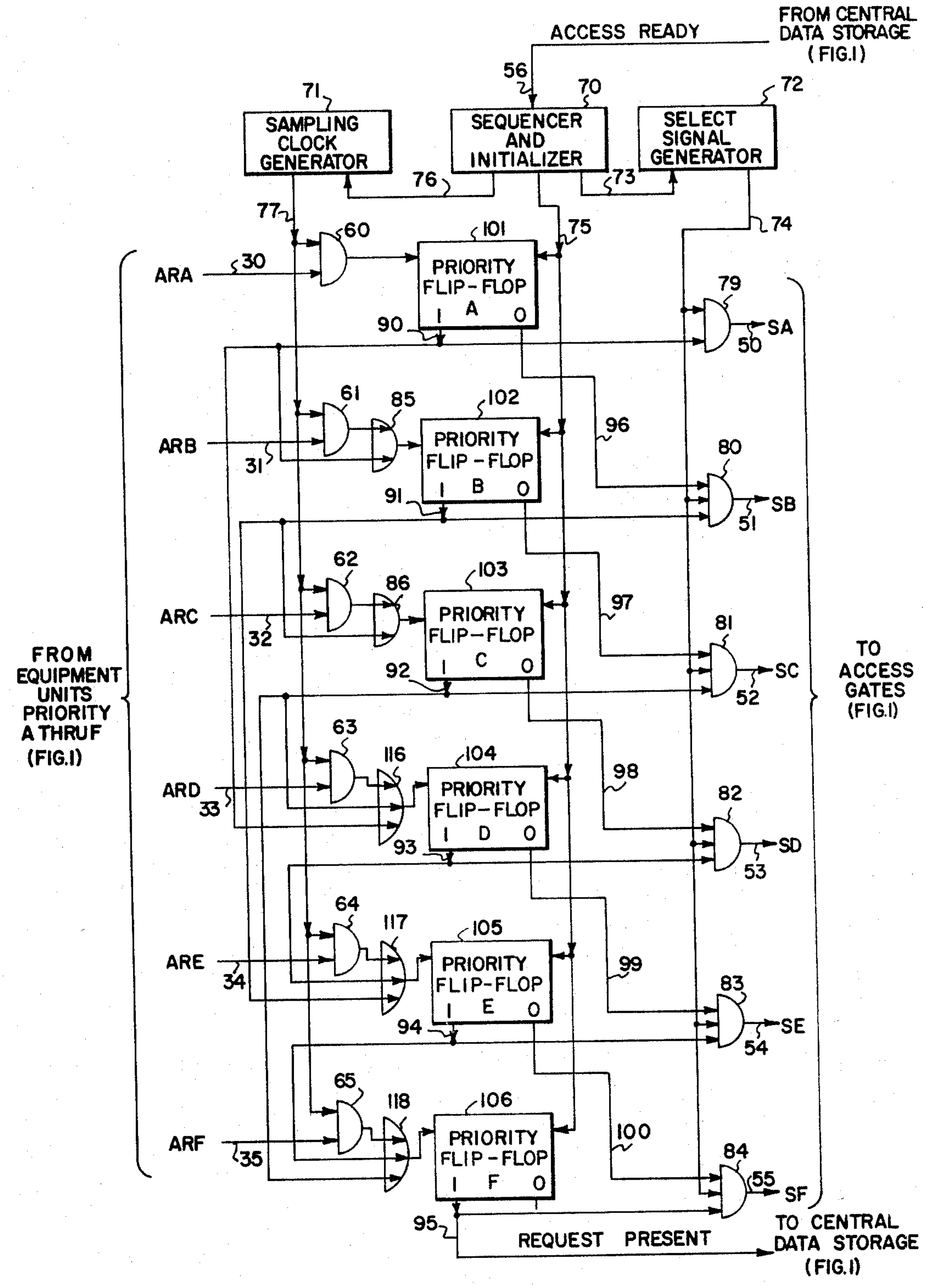
FIG. 3 is a logical schematic diagram of another embodiment of the priority selector shown in FIG. 1.

A more detailed discussion of the logical structure of priority selector 10 will be understood by making reference to the embodiments of FIGS. 2 and 3. The following circuits find general employment in the priority selector of FIGS. 2 and 3; flip-flops, AND-gates, and OR-gates. Standard symbols are employed throughout the selector logic diagrams to represent these circuits.

The flip-flop provides a temporary storage cell for a control signal. The symbols identified by reference numerals 101–106 in FIGS. 2 and 3 represent flip-flops for storing request signals. The flip-flop, or bistable multivibrator, is a circuit adapted to operate in either one of two stable states and to transfer from the state in which it is operating to the other stable state upon application of a trigger signal thereto. In one state of operation called its 1-state or set state, the flip-flop represents a binary 1 and in the other state, which is called its 0-state or reset state, represents a binary 0. Such flip-flops deliver a binary 1 signal from the 1-output terminal when the flip-flop is in the 1-state and a binary 1 signal from the 0-output terminal when the flip-flop is in the 0-state. Flip-flops are identified in accordance with the function they perform. For example, the priority flip-flop A designation indicates that this flip-flop stores the request signal from the equipment unit which is allocated priority A. An access request signal on line 30 sets priority flpi-flop A to the 1-state. Similarly access request signals on lines 31–35 set priority flip-flops B–F respectively to the 1-state. The type of flip-flop described herein is well known in the art.

An AND-gate provides the logical operation of conjunction for binary signals applied thereto. The symbols identified by the reference numerals 79 and 80 in FIG. 2 represent two and three input AND-gates respectively. Such AND-gates deliver a binary 1 output signal only when all of the input signals applied thereto represent a binary 1. Both types of AND-gates described herein are well known in the art.

An OR-gate provides the logical operation of inclusive-OR for binary input signals applied thereto. The symbols identified by reference numerals 86 and 116 in FIG. 3 represent two and three input OR-gates respectively. Such OR-gates deliver a binary 1 output signal when any one or all of the input signals applied thereto represent binary 1's. Both types of OR-gates described herein are well known in the art.

With reference to FIG. 2, the sequencer and initializer 70 controls the entry of access request signals into priority flip-flops A–F, identified by reference numerals 101–106 respectively and the generation of the priority selector output signal in the priority selector. Sequencer and initializer 70 initially provides a signal on line 75 resetting all priority flip-flops A–F to the 0-state. Sequencer and initializer 70 then provides a signal on line 76 to sampling clock generator 71 to initiate the generation of sampling clock pulses.

Sampling clock generator 71 provides output sampling pulses at regular intervals on line 77 to enable input AND-gates 60–65 when access request signals are present from the associated equipment units. Each of input AND-gates 60–65 receiving an access request signal ARA–ARF on lines 30–35 respectively, at the instant when a sampling pulse is present on line 77, is enabled, providing a binary 1 output signal. The binary 1 output signal of input AND-gate 60 sets flip-flop 101 to the 1-state. The binary 1 output signals of input AND-gates 61–65 are applied to OR-gates 85–89 respectively, the binary 1 output signals of OR-gates 85–89 setting the corresponding ones of flip-flops 102–106 to the 1-state. Thus, all access request signals present on lines 30–35 at a given instant are sampled in parallel for setting corresponding priority flip-flops A–F.

Priority flip-flops A–F apply 1-output signals on lines 90–95 to corresponding output AND-gates 79–84 respectively. As illustrated in FIG. 2, the 1-output signal of each of priority flip-flops A–E is also applied to the appropriate one of OR-gates 85–89 associated with the next lower priority flip-flop. Thus, each priority flip-flop which is set to the 1-state by an access request signal enables the sequence OR-gate corresponding to the next lower priority flip-flop to set the next lower priority flip-flop to the 1-state. Assuming that priority flip-flop A has been set to the 1-state by access signal ARA, the 1-output signal on line 90 from priority flip-flop A enables OR-gate 85 to provide a signal which sets priority flip-flop B. Similarly, the 1-output signals from priority flip-flops B–E on lines 91–94 respectively enable OR-gates 86–89, sequentially propagating the 1-output signal from each priority flip-flop to set the next lower priority flip-flop. The result is that each priority flip-flop set to the 1-state sets the next lower priority flip-flop to the 1-state. Thus, in response to access request signal ARA, binary 1 signals are present on lines 90–95 and are applied to output AND-gates 79–84 respectively.

The 0-output signals of priority flip-flops A–E are applied to the output AND-gate corresponding to the next lower priority flip-flop. Since the 0-output signal from a priority flip-flop in the 1-state is a binary 0, each priority flip-flop which is set to the 1-state disables the output AND-gate corresponding to the next lower priority flip-flop. Thus, for an output AND-gate to be enabled by the 1-output of its corresponding priority flip-flop in the 1-state, it is also necessary that the next higher priority flip-flop be in its reset or 0-state. Priority flip-flop A, when set to its 1-state, provides a binary 0 signal on line 96 to disable output AND-gate 80. Similarly when priority flip-flops B–E are set in the 1-state, the binary 0 output signals on lines 97–100 disable output AND-gates 81–84 respectively. The result is that all priority flip-flops set to the 1-state inhibit the output AND-gate corresponding to the next lower priority flip-flop, with only the output AND-gate corresponding to the highest priority flip-flop set to the 1-state being enabled.

Upon completion of the sampling of the access request signals and after all priority flip-flops have assumed their correct states, sequencer and initializer 70 provides a selection signal on line 74 for application to output AND-gates 79–84. Since the lowest priority flip-flop F is always set at the completion of each sequence, if an access request signal was present, the binary 1 signal on line 95 serves as a request present signal which is applied to central data storage 11, as shown in FIG. 1. Central data storage 11 responds to the request present signal by providing an access ready signal on line 56 to sequencer and initializer 70. Sequencer and initializer 70 then provides a signal on line 76 to sampling clock generator 71, causing discontinuation of sampling pulses to prevent entry of further access requests until a data transfer operation between central data storage 11 and the selected equipment unit has been completed. Sequencer and initializer 70 also provides a signal on line 73 to select signal generator 72 to initiate generation of a selection signal. Select signal generator 72 then provides the enabling selection signal on line 74 to each of output AND-gates 79–84.

The selection signal on line 74 enables the output AND-gate receiving a binary 1 signal from the highest priority flip-flop which is in the set state, providing a priority selector output signal from the output AND-gate. Output AND-gate 79 is enabled to provide priority selector output signal SA on line 50 when priority flip-flop A is in the set state. Output AND-gate 80 is enabled to provide priority selector output signal SB on line 51 when priority flip-flop B is in the set state and priority flip-flop A is in the reset state. Similarly output AND-gates 81–84 are enabled to provide priority selector output signals SC–SF on lines 52–55 respectively when the corresponding one of priority flip-flops C–F is in the set state and all higher priority flip-flops are in the reset state. Thus, one priority selector output signal is provided on one of lines 50–55 for connection to the corresponding one of access gates 21–26, as shown in FIG. 1.

The priority selector output signal establishes a data flow path between the highest priority equipment unit requesting access at a given instant and central data storage 11. Priority selector output signal SA on line 50 enables access gate 21 to provide a data flow path from equipment unit priority A to central data storage 11 over line 40 and common data flow bus 20. Similarly priority selector output signals SB–SF on lines 51–55 enable access gates 22–26 respectively to provide data flow paths from the corresponding equipment units to central data storage 11 over lines 41–45 and common data flow bus 20.

Following completion of the data transfer between the selected equipment unit and central data storage 11, the sampling of access request signals from the equipment unts is resumed and another data transfer operation is controlled by the priority selector of FIG. 2. At the completion of each data transfer operation, central data storage 11 removes the access ready signal on line 56 to sequencer and initializer 70, as shown in FIG. 2. Sequencer and initializer 70 then removes the signal on line 73 to cause select signal generator 72 to discontinue generation of the selection signal on line 74. Sequencer and initializer 70 then provides a signal on line 75 to reset each priority flip-flop to the 0-state and also provides a signal on line 76 to sampling clock generator 71 to initiate generation of sampling pulses on line 77. Sampling pulses are applied to input AND-gates 60–65 at regular intervals until a request signal is present to initiate a new selection sequence.

The generation of more than one priority selector output signal by the priority selector of FIG. 2 is prevented by setting to the 1-state each flip-flop representing a priority lower than that of the flip-flop set by the highest priority access request signal. A late arriving lower priority access request signal cannot set the corresponding priority flip-flop since it is already in the set state. As described previously, the output of each priority flip-flop is used to set the next lower priority flip-flop; therefore, propagation of the set state of one flip-flop to all lower priority flip-flops is self-sustaining once it has been initiated.

The maximum response time of the embodiment of FIG. 2 is the time required for the set state of priority flip-flop A to sequentially propagate through all lower priority flip-flops until priority flip-flop F is set to the 1-state. The request present signal from the 1-output of the lowest priority flip-flop, i.e., priority flip-flop F, determines the time at which the selection signal is applied to output AND-gates 79-84. Therefore, a worst case condition exists when only the highest priority request is present requiring the sequential setting of all priority flip-flops. The response time of the embodiment of FIG. 2 is minimized when only the lowest priority access request is present, since then only one flip-flop need be set to the 1-state. When more than one access request signal is present, selection sequences are initiated by each priority flip-flop which is set in response to an access request signal. Therefore, the response time will be the time required to close the gap between each flip-flop initially in the set state due to access request signals. For example, the selection sequence initiated by a late arriving high priority access request signal would not have to place all lower priority flip-flops in the set state if a lower priority access request occurred concurrently with or earlier than the high velocity access request signal. The high priority flip-flop in the set state would initiate a selection sequence that would set only the priority flip-flops in the gap to the lower priority flip-flop which was placed in the set state at the time of sampling access request signals.

The response time of the priority selector is reduced by employing the embodiment of FIG. 3. The priority selector of FIG. 3 is similar to that shown in FIG. 2 with the exception that a plurality of selection sequences are initiated by each access request signal, to reduce the response time of the priority selector. As was previously explained, all access request signals present when a sampling pulse is applied to the input AND-gates are entered in parallel and set the corresponding priority flip-flops. The output of each priority flip-flop set by an access request signal initiates a selection sequence, as described for the embodiment of FIG. 2. In the embodiment of FIG. 3, the 1-output signal of a high priority flip-flop is employed to set not only the next lower priority flip-flop, but also several lower priority flip-flops. A plurality of selection sequences, initiated by a single access request signal, are thus in progress at the same time. Therefore, the response time of the priority selector is reduced accordingly.

The basic structure of the priority selector embodiment of FIG. 3 is identical to the embodiment of FIG. 2, except that the two-input OR-gates 87–89 in FIG. 2 are replaced with three-input OR-gates 116–118 respectively and additional connections of the 1-outputs of priority flip-flops A–C are made to input OR-gates 116–118.

As shown in FIG. 3, each of the 1-output signals from priority flip-flops A–C on lines 90–92, in addition to being applied to the next lower priority flip-flop, are also applied in parallel to the input OR-gate of an additional lower priority flip-flop. The 1-output signal of priority flip-flop A is thus applied to input OR-gate 116 of priority flip-flop D as well as to input OR-gate 85 of priority flip-flop B. The 1-output signal of priority flip-flop B is applied to input OR-gates 86 and 117 of priority flip-flops C and E respectively. Similarly, the 1-output of priority flip-flop C is applied to the input OR-gates of both priority flip-flop D and priority flip-flop F. Thus, the 1-output on line 90 when priority flip-flop A is in the set state enables input OR-gates 85 and 116 to provide signals to set priority flip-flops B and D respectively. Similarly, the 1-outputs on lines 91 and 92 when priority flip-flops B and C respectively are in the set state enable input OR-gates 86, 117 and 116, 118 respectively to set prior flip-flops C, E and D, F. This arrangement permits each of priority flip-flops A, B, and C, when set to the 1-state, to set the next lower priority flip-flop and also an additional lower priority flip-flop. Each priority flip-flop in the set state provides sequential setting of the remaining lower priority flip-flops, as previously described. The priority selector of FIG. 3 may also be arranged so that each higher priority flip-flop sets any desired number of lower priority flip-flops in parallel.

The 0-output signals from all priority flip-flops set to the 1-state provide for inhibiting of the 1-output signals from all lower priority flip-flops. Priority flip-flop A, when set to its 1-state in response to access request signal ARA, provides a 0-output signal on line 96 to disable output AND-gate 80 and simultaneously provides a 1-output signal on line 90 for parallel setting of priority flip-flops B and D. Priority flip-flops B and D then provide outputs for setting all lower priority flip-flops to the 1-state and for inhibiting the 1-output signals of all such lower priority flip-flops. Similarly priority flip-flops B and C when set to the 1-state provide 0-output signals on lines 97 and 98 to disable output AND-gates 81 and 82 respectively. Priority flip-flops B and C also provide 1-outputs on lines 91 and 92 to set priority flip-flops C, E and D, F in parallel. The 0-outputs of priority flip-flops D and E are applied on lines 99 and 100 to disable output AND-gates 83 and 84 respectively. The result is that each of priority flip-flops A, B and C, when set to the 1-state, inhibit the output AND-gate of the next lower priority flip-flop and initiate parallel selection sequences which set all lower priority flip-flops and inhibit their corresponding output AND-gates.

The maximum response time for the priority selector of FIG. 3 is the time required to set one-half of the priority flip-flops in sequence. Assuming that access request signal ARA is present setting priority flip-flop A, the 1-output from priority flip-flop A in its set state sets priority flip-flops B and D in parallel. The 1-outputs of priority flip-flops B and D, in turn, set priority flip-flops C and E, in parallel. Priority flip-flop F is set by either of priority flip-flops C and E. Similarly when access request signal ARB sets priority flip-flop B to its 1-state, its 1-output sets priority flip-flops C and E. The 1-outputs of priority flip-flops C and E then set priority flip-flops D and F. If only priority flip-flop C is set by an access request signal, its 1-output sets priority flip-flops D and F. The 1-output of priority flip-flop D sets priority flip-flop E. A priority selector of any desired response time may be constructed by provision of priority flip-flops properly connected in parallel and in series.

In summary, the priority selector of the invention sets the storage cell corresponding to the highest priority access request and all lower priority storage cells to the 1-state to provide effective priority selection without the incorporation of complicated circuitry to prevent race conditions or to protect against multiple selection. All priority selector output signals other than the one corresponding to the highest priority request are inhibited without use of complex inhibit logic elements. Since the lowest priority storage element is always set at the conclusion of a selection sequence, its 1-output provides a request present indication without the necessity of additional circuit elements. One embodiment of the priority selector of the invention is easily adapted to provide any desirable response time. A priority selector can be constructed in accordance with this invention to provide any response time varying from the time required to set all priority flip-flops in sequence, to the time required to set only two priority flip-flops in sequence.

While the principles of the invention have now been made clear in illustrative embodiments, there will be immediately obvious to those skilled in the art many modifications of structure, arrangement, proportions, the elements, materials, and components, used in the practice of the invention, and otherwise, which are particularly adapted for specific environments and opening requirements without departing from those principles. The appended claims are, therefore, intended to cover and embrace any such modifications, within the limits only of the true spirit and scope of the invention.

What is claimed is:

1. In a data transfer system wherein one of a plurality of equipment units is selected for access to a common apparatus, each equipment unit having a higher or lower priority with respect to other equipment units and providing an access request signal when it requires access to the common apparatus, the combination comprising: a plurality of bistable storage elements, one of said bistable storage elements being associated with each equipment unit and representing the priority of that equipment unit, each of said bistable storage elements being in a first state in response to an access request signal from its associated equipment unit and being in a second state in the absence of an access request signal from its associated equipment unit, means for applying access request signals from the equipment units to the corresponding ones of said storage elements, first control means connected to each of said storage elements and responsive to each storage element in the first state for placing all storage elements representing lower priority equipment units in the first state, and second control means connected to the plurality of equipment units and to the common apparatus and responsive to the first state of the bistable storage element representing the highest priority equipment unit providing an access request signal for establishing a data transfer path between that equipment unit and the common apparatus.

2. In a data transfer system wherein one of a plurality of equipment units is selected for access to a common apparatus, each equipment unit having a higher or lower priority with respect to other equipment units and providing an access request signal when it requires access to the common apparatus, the combination comprising: a plurality of bistable storage elements, one of said bistable storage elements being associated with each equipment unit and representing the priority of that equipment unit, each of said bistable storage elements being in a first state in response to an access request signal from its associated equipment unit and being in a second state in the absence of an access request signal from its associated equipment unit, means for applying access request signals from the equipment units to the corresponding ones of said storage elements, first control means connected to each of said storage elements and responsive to each storage element in the first state for placing all storage elements representing lower priority equipment units in the first state, second control means connected to the plurality of equipment units and to the common apparatus and responsive to the first state of the bistable storage element representing the highest priority equipment unit providing an access request signal for establishing a data transfer path between that equipment unit and the common apparatus, and signaling means connected to the storage element representing the lowest priority equipment unit for providing a signal when that storage element is in its first state indicating that one of said equipment units has provided an access request signal.

3. In a data transfer system wherein one of a plurality of equipment units is selected for access to a common apparatus, each equipment unit having a higher or lower priority with respect to other equipment units and providing an access request signal when it requires access to the common apparatus, the combination comprising: a plurality of bistable storage elements, one of said bistable storage elements being associated with each equipment unit and representing the priority of that equipment unit, each of said bistable storage elements being in a first state in response to an access request signal from its associated equipment unit and being in a second state in the absence of an access request signal from its associated equipment unit, means for applying access request signals from the equipment units to the corresponding ones of said storage elements, first control means connected to each of said storage elements and responsive to each storage element in the first state for placing the storage element representing the next lower priority equipment unit in the first state, and second control means connected to the plurality of equipment units and to the common apparatus and responsive to the first state of the bistable storage element representing the highest priority equipment unit providing an access request signal for establishing a data transfer path between that equipment unit and the common apparatus.

4. In a data transfer system wherein one of a plurality of equipment units is selected for access to a common apparatus, each equipment unit having a higher or lower priority with respect to other equipment units and providing an access request signal when it requires access to the common apparatus, the combination comprising: a plurality of bistable storage elements, one of said bistable storage elements being associated with each equipment unit and representing the priority of that equipment unit, each of said bistable storage elements being in a first state in response to an access request signal from its associated equipment unit and being in a second state in the absence of an access request signal from its associated equipment unit, means for applying access request signals from the equipment units to the corresponding ones of said storage elements, first control means connected to each of said storage elements and responsive to each storage element in the first state for placing at least one storage element representing a lower priority equipment unit in the first state, and second control means connected to the plurality of equipment units and to the common apparatus and responsive to the first state of the bistable storage element representing the highest priority equipment unit providing an access request signal for establishing a data transfer path between that equipment unit and the common apparatus.

5. In a data transfer system wherein one of a plurality of equipment units is selected for access to a common apparatus, each equipment unit having a higher or lower priority with respect to the other equipment units and providing an access request signal when it requires access to the common apparatus, the combination comprising: a plurality of bistable storage elements, one of said bistable storage elements being associated with each equipment unit and representing the priority of that equipment unit, each of said bistable storage elements being in a first state in response to an access request signal from its associated equipment unit and being in a second state in the absence of an access request signal from its associated equipment unit, means for applying access request signals from the equipment units to the corresponding ones of said storage elements, a plurality of first gating means, one of said gating means being connected to each of said storage elements and responsive to the first state of the storage element representing the next higher priority equipment unit for placing the associated storage element in the first state, second gating means connected to the output of each storage element and responsive to the first state of the storage element representing the next higher priority equipment unit for inhibiting the output of the associated storage element, and control means connected to the plurality of equipment units and to the common apparatus and responsive to the output of the second gating means for establishing a data transfer path between the equipment unit representing the highest priority equipment unit providing an access request signal and the common apparatus.

6. In a data transfer system wherein one of a plurality of equipment units is selected for access to a common apparatus, each equipment unit having a higher or lower priority with respect to the other equipment units and providing an access request signal when it requires access to the common apparatus, the combination comprising: a plurality of bistable storage elements, one of said bistable storage elements being associated with each equipment unit and representing the priority of that equipment unit, each of said bistable storage elements being in a first state in response to an access request signal from its associated equipment unit and being in a second state in the absence of an access request signal from its associated equipment unit, means for applying access request signals from the equipment units to the corresponding ones of said storage elements, a plurality of first gating means, one of said gating means being connected to each of said storage elements and responsive to the first state of the storage element representing the next higher priority equipment unit for placing the associated storage element in the first state, second gating means connected to the output of each storage element and responsive to the first state of the storage element representing the next higher priority equipment unit for inhibiting the output of the associated storage element, control means connected to the plurality of equipment units and to the common apparatus and responsive to the output of the second gating means for establishing a data transfer path between the equipment unit representing the highest priority equipment unit providing an access request signal and the common apparatus, and signaling means connected to the storage element representing the lowest priority equipment unit for providing a signal when that storage element is in its first state indicating that one of said equipment units has provided an access request signal.

7. In a data transfer system wherein one of a plurality of equipment units is selected for access to a common apparatus, each equipment unit having a higher or lower priority with respect to other equipment units and providing an access request signal when it requires access to the common apparatus, the combination comprising: a plurality of bistable storage elements, one of said bistable storage elements being associated with each equipment unit and representing the priority of that equipment unit, each of said bistable storage elements being in a first state in response to an access request signal from its associated equipment unit and being in a second state in the absence of an access request signal from its associated equipment unit, means for applying access request signals from the equipment units to the corresponding ones of said storage elements, a plurality of first gating means, one of said gating means being connected to each of said storage elements and responsive to the first state of at least one storage element representing a higher priority equipment unit for placing the associated storage element in the first state, second gating means connected to the output of each storage element and responsive to the first state of the storage element representing the next higher priority equipment unit for inhibiting the output of the associated storage element, and control means connected to the plurality of equipment units and to the common apparatus and responsive to the output of the second gating means for establishing a data transfer path between the equipment unit representing the highest priority equipment unit providing an access request signal and the common apparatus.

8. In a data transfer system wherein one of a plurality of equipment units is selected for access to a common apparatus, each equipment unit having a higher or lower priority with respect to other equipment units and providing an access request signal when it requires access to the common apparatus, the combination comprising: a plurality of bistable storage elements, one of said bistable storage elements being associated with each equipment unit and representing the priority of that equipment unit, each of said bistable storage elements being in a first state in response to an access request signal from its associated equipment unit and being in a second state in the absence of an access request signal from its associated equipment unit, means for applying access request signals from the equipment units to the corresponding ones of said storage elements, a plurality of first gating means, one of said gating means being associated with each of said storage elements and responsive to the first state of at least one storage element representing a higher priority equipment unit for placing the associated storage element in the first state, second gating means connected to the output of each storage element and responsive to the first state of the storage element representing the next higher priority equipment unit for inhibiting the output of the associated storage element, control means connected to the plurality of equipment units and to the common apparatus and responsive to the output of the second gating means for establishing a data transfer path between the equipment unit representing the highest priority equipment unit providing an access request signal and the common apparatus, and signaling means connected to the storage element representing the lowest priority equipment unit for providing a signal when that storage element is in the first state indicating that one of said equipment units has provided an access request signal.

9. A priority signal selector device for providing an output priority signal in response to a plurality of input signals from external sources, each input signal being given a higher or lower priority with respect to other input signals, said priority signal selector comprising: a plurality of flip-flops, each of said flip-flops being associated with one of the input signals and representing the priority of that signal, each of said flip-flops being in either a first or a second state, input means responsive to said input signals for providing signals placing the corresponding flip-flops in the first state, said input means including a plurality of OR-gates, each of said OR-gates being connected to a predetermined one of said flip-flops, each of said OR-gates being responsive to an input signal and to the first state of the flip-flop representing the next higher priority input signal for providing a signal placing the corresponding flip-flop in the first state, and output means connected to the outputs of said plurality of flip-flops to provide an output priority signal representing the highest priority input signal, said output means including a plurality of AND-gates, each of said AND-gates being connected to a predetermined one of said flip-flops, each of said AND-gates being inhibited in response to the first state of the flip-flop representing the next higher priority input signal.

10. A priority signal selector device for providing an output priority signal in response to a plurality of input signals from external sources, each input signal being given a higher or lower priority with respect to other input signals, said priority signal selector comprising: a plurality of flip-flops, each of said flip-flops being associated with one of the input signals and representing the priority of that signal, each of said flip-flops being in either a first or a second state, input means responsive to said input signals for providing signals placing the corresponding flip-flops in the first state, said input means including a plurality of OR-gates, each of said OR-gates being connected to a predetermined one of said flip-flops, each of said OR-gates being responsive to an input signal and to the first state of the flip-flop representing the next higher priority input signal for providing a signal placing the corresponding flip-flop in the first state, output means connected to the outputs of said plurality of flip-flops to provide an output priority signal representing the highest priority input signal, said output means including a plurality of AND-gates, each of said AND-gates being connected to a predetermined one of said flip-flops, each of said AND-gates being inhibited in response to the first state of the flip-flop representing the next higher priority input signal, and signaling means connected to the flip-flop representing the lowest priority input signal for providing a signal when that flip-flop is in the first state indicating that one of said external sources has provided an input signal.

11. A priority signal selector device for providing an output priority signal in response to a plurality of input signals from external sources, each input signal being given a higher or lower priority with respect to other input signals, said priority signal selector comprising: a plurality of flip-flops, each of said flip-flops being associated with one of the input signals and representing the priority of that signal, each of said flip-flops being in either a first or a second state, input means responsive to said input signals for providing signals placing the corresponding flip-flops in the first state, said input means including a plurality of OR-gates, each of said OR-gates being connected to a predetermined one of said flip-flops, each of said OR-gates being responsive to an input signal and to the first state of at least one flip-flop representing a higher priority input signal for providing a signal placing the corresponding flip-flop in the first state, and output means connected to the outputs of said plurality of flip-flops to provide an ontput priority signal representing the highest priority input signal, said output means including a plurality of AND-gates, each of said AND-gates being connected to a predetermined one of said flip-flops, each of said AND-gates being inhibited in response to the first state of the flip-flop representing the next higher priority input signal.

12. A priority signal selector device for providing an output priority signal in response to a plurality of input signals from external sources, each input signal being given a higher or lower priority with respect to other input signals, said priority signal selector comprising: a plurality of flip-flops, each of said flip-flops being associated with one of the input signals and representing the priority of that signal, each of said flip-flops being in either a first or a second state, input means responsive to said input signals for providing signals placing the corresponding flip-flops in the first state, said input means including a plurality of OR-gates, each of said OR-gates being connected to a predetermined one of said flip-flops, each of said OR-gates being responsive to an input signal and to the first state of at least one flip-flop representing a higher priority input signal for providing a signal placing the corresponding flip-flop in the first state, output means connected to the outputs of said plurality of flip-flops to provide an output priority signal representing the highest priority input signal, said output means including a plurality of AND-gates, each of said AND-gates being connected to a predetermined one of said flip-flops, each of said AND-gates being inhibited in response to the first state of the flip-flop representing the next higher priority input signal, and signaling means connected to the flip-flop representing the lowest priority input signal for providing a signal when that flip-flop is in the first state indicating that one of said external sources has provided an input signal.

References Cited

UNITED STATES PATENTS

| | | | |
|---|---|---|---|
| 3,099,818 | 7/1963 | Murray | 340—172.5 |
| 3,208,048 | 9/1965 | Kilburn et al. | 340—172.5 |
| 3,239,819 | 3/1966 | Masters | 340—172.5 |
| 3,283,306 | 11/1966 | Patrusky | 340—172.5 |
| 3,298,001 | 1/1967 | Couleur et al. | 340—172.5 |

ROBERT C. BAILEY, *Primary Examiner.*

R. B. ZACHE, *Assistant Examiner.*